H. AUSTIN.
ROAD WHEEL OF THE SHEET METAL TYPE.
APPLICATION FILED FEB. 24, 1920.

1,340,697.                                    Patented May 18, 1920.
                                                      2 SHEETS—SHEET 1.

INVENTOR
Herbert Austin
By Frank Chase Somes
ATTORNEY

H. AUSTIN.
ROAD WHEEL OF THE SHEET METAL TYPE.
APPLICATION FILED FEB. 24, 1920.

1,340,697. Patented May 18, 1920.
2 SHEETS—SHEET 2.

UNITED STATES PATENT OFFICE.

HERBERT AUSTIN, OF BROMSGROVE, ENGLAND.

ROAD-WHEEL OF THE SHEET-METAL TYPE.

1,340,697.  Specification of Letters Patent.  Patented May 18, 1920.

Application filed February 24, 1920. Serial No. 360,857.

*To all whom it may concern:*

Be it known that I, HERBERT AUSTIN, a subject of the King of Great Britain, and residing at Bromsgrove, in the county of Worcester, England, engineer, have invented certain new and useful Improvements in Road-Wheels of the Sheet-Metal Type, More Particularly in Such Wheels which are Used with Automobiles, of which the following is a specification.

This invention relates to sheet metal disk wheels having radial flutes or corrugations, which may represent spokes, and which are clamped at their inner ends within correspondingly formed recesses in a flange or shoulder of the wheel hub, and consists in forming the corrugations at their inner ends with straight slanted sides and so disposing the corrugations that they, and the spaces between them, are symmetrical about a median plane which is at right angles to the wheel axis. Such a construction has the advantage that a disk may be put on either way around, and if, as is preferred, the recesses in the hub are of the same shape and size as the spaces between the corrugations of the disk, the said corrugations, when tightened up in relation to the hub, engage the recesses of such part with a wedging action. The recesses in the hub do not necessarily correspond in shape or size to the spaces between the corrugations of the disk, but may be of any dimension so long as they are such as to fulfil the above function. Furthermore the construction permits of two similar disks being clamped together with the corrugations of the one engaging with, and wedging into, that of the other. The symmetrical construction of the corrugations allows a space to be left between the base of a recess or space and the end surface of a corrugation thus leaving "draft" for tightening or wear. The disk is preferably formed with a central hole to allow it to be passed over the hub, and the corrugations aforesaid immediately surround this hole. To fix the disk to the hub its corrugations are placed within and tightened up into the corrugations of the hub, such as by bolts which pass through the disk and through the flange or by set pins which pass through the disk and enter the shoulder, or by a nut or screwed collar which is screwed upon the hub. The disk may be dished, if desired, in which case the rim may be in a different plane from that of the middle of the disk.

In applying the invention to a twin tired wheel, two disks constructed as above described are used, each carrying a rim, and they may each of them have their corrugations engaged with corrugations formed in a separate flange of the wheel hub; or the corrugations of the one may be fitted within the corrugations of the other while the corrugations of one of them are fitted within corrugations of the hub. In such case each of the disks is preferably dished in a direction away from the other. The corrugations of the disks may, if desired, be fitted into corrugations at opposite sides of a flange on the hub. In either case the disks are clamped together and to the flange or shoulder, as the case may be, as above described.

In order that the invention may be readily understood, I will now describe convenient applications thereof, by reference to the drawings herewith, of which:—

Figure 1:
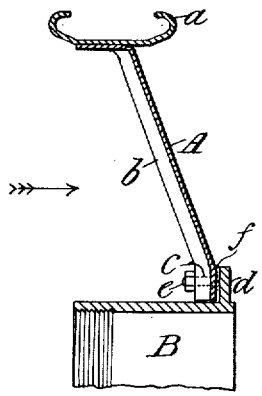
Figure 1 is a vertical section of a portion of a wheel constructed according to this invention, the section being taken in the plane indicated by the line 1 1 of Fig. 2.
Figure 2:
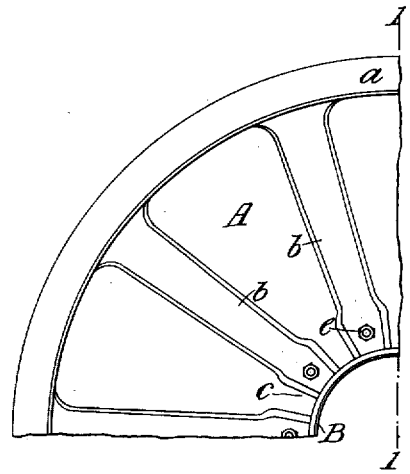
Fig. 2 is an outer side view of the wheel portion illustrated in Fig. 1.
Figure 3:
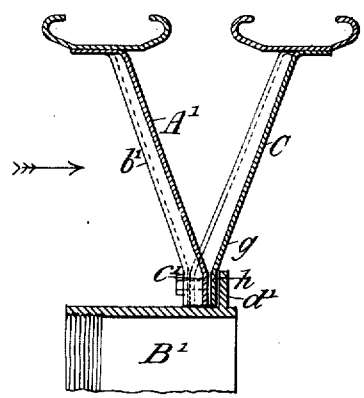
Fig. 3 is a sectional view corresponding to Fig. 1; but illustrating a modification in which two disks are employed, the section being taken on the line 3, 3 of Fig. 4.
Figure 4:
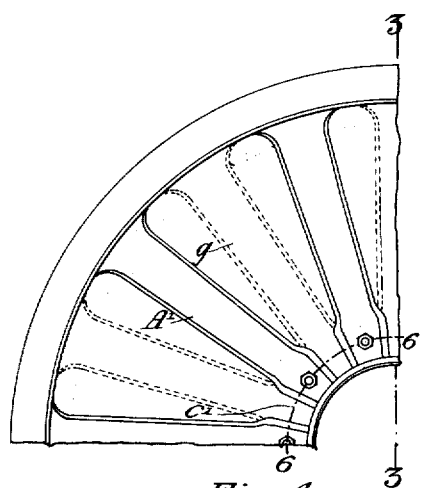
Fig. 4 is an outer side view of the wheel illustrated in Fig. 3.
Figure 5:
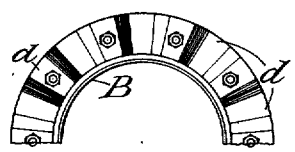
Fig. 5 is a fragmentary outer side view of the hub of the wheel illustrated in Figs. 1 and 2, or of the hub of the wheel illustrated in Figs. 3 and 4.
Figure 6:
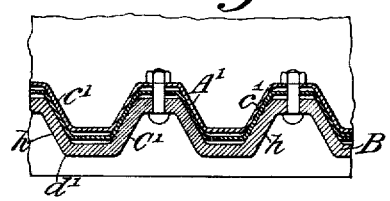
Fig. 6 is a spread out sectional view the section being taken on line 6, 6, of Fig. 4.

Referring first to Figs. 1, 2 and 5, A is the disk carrying at its outer periphery a grooved rim $a$ adapted to receive a tire and having spokes $b$ pressed out from its surface. The spokes $b$ together with the spaces between form at their inner ends a circular series of similar corrugations constituting beveled angular ribs and flaring angular recesses, having parallel plain portions at the inner and outer surfaces of the disk as shown in Fig. 6. B is the wheel hub having a flange $d$ formed with corrugations constituting beveled angular ribs and flaring angular recesses having parallel plain portions at the inner and outer faces of the flange to correspond with those of the disk. The disk A has a central hole and is put on over the outer end of the hub and its corrugations $c$ are clamped within those of the flange $d$ by bolts $e$ which are passed through holes in the inner ends of the spokes and through corresponding holes in the flange $d$. As will be seen from the drawings the corrugations are so arranged that those of the disk will wedge themselves within those of the flange, spaces $f$ being left to allow of this.

Referring now to Figs. 3, 4, 5 and 6, two disks A' and C are provided each dished in a direction away from the other. The disk A' has spokes $b'$ and corrugations $c'$ while the disk C has spokes $g$ and corrugations $h$. The corrugations $c'$ are fitted within the corrugations $h$ and the latter are fitted within corresponding corrugations formed in the flange $d'$ of the hub B'. The disks and flange are then bolted together as described with reference to the single disk and flange described with reference to Fig. 1. It will be seen in these views that a corrugation of either disk which forms the inner end of a spoke of such disk corresponds with a corrugation which forms one of the spaces between two spokes of the other disk.

Figures 7, 8:
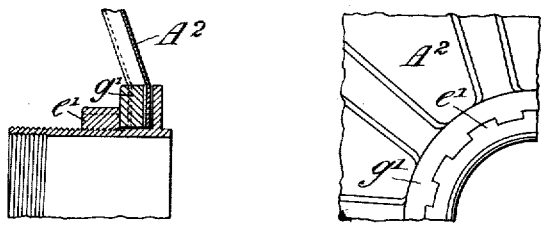
Fig. 7 is a fragmentary sectional view to illustrate a modification of the means for securing a disk upon the hub.
Fig. 8 is an outer side view of the wheel portion shown by Fig. 7.

Referring to Figs. 7 and 8, A² represents a single disk secured in place by a nut $e'$ which is screwed on to the hub from the outer face thereof. $g'$ is a washer interposed between the nut $e'$ and the disk and having a plain outer surface and corrugations in its inner surface to correspond with the corrugations of the disk.

Figure 9:
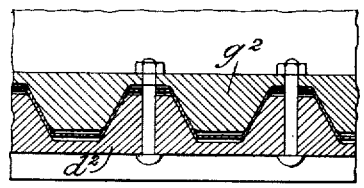
Fig. 9 is a view corresponding to Fig. 6, except that only one disk is shown, and illustrating a modification in which a washer is placed between the disk and the nuts of the securing bolts.

Referring to Fig. 9, the flange $d^2$ is shown with corrugations only on the side which is toward the disk its other side being formed plain. In this view a single disk is shown, and in lieu of the nuts of the bolts bearing directly on the disk, a washer $g^2$ is interposed between such nuts and the disk. The washer is shown as having corrugations only on that side which is toward the disk the other side being formed plain.

The washer described with reference to Figs. 7 and 8 and also that described with reference to Fig. 9 may, for the sake of lightness, be formed with corrugations in their outer side faces also, if desired; or such washers may have both their faces formed plain.

The single disk or the twin disks may be readily removed from the wheel hub and be replaced by a fresh disk or twin disks to avoid delay in refixing a tire, and, in the case of twin disks one of them might be removed from a rear axle and used with a front axle and the other be temporarily used alone with the rear axle.

The wheel disk is preferably constructed when maximum strength is desired with the metal of the disk solid between the spoke formations as shown, but the invention is not limited to such form.

A disk or disks of a wheel constructed as above described might be fixed against the face of a flange of the wheel hub which faces in the direction opposite to that of the outer end of the hub; but, if it is desired that the disk or disks shall be readily removable from the hub without disturbing the hub, it or they would be fixed against the face of a flange which faces in the direction of the outer end of the hub.

Having fully described my invention, what I claim and desire to secure by Letters Patent, is:—

1. A vehicle wheel comprising a hub having a flange provided with a circular series of similar corrugations forming beveled angular ribs and flaring angular recesses, said ribs and recesses having parallel plain portions at the inner and outer faces of the flange, a disk having a central opening adapted to fit over said hub and provided with a circular series of radial corrugations constituting spoke formations, said corrugations at their inner ends surrounding said hole and forming beveled angular ribs with plain portions and flaring angular recesses with plain portions fitting with a wedging action on said ribs and recesses of said flange, and fastening means extending through said plain portions of said ribs and recesses and connecting said hub and disk.

2. A vehicle wheel comprising a hub having a flange provided with a circular series of similar corrugations forming beveled angular ribs and flaring angular recesses, said ribs and recesses having parallel plain portions at the inner and outer faces of the flange, a disk having a central opening adapted to fit over said hub and provided with a circular series of radial corrugations constituting spoke formations, said corrugations at their inner ends surrounding said hole and forming beveled angular ribs with plain portions and flaring angular recesses with plain portions fitting with a wedging action on said ribs and recesses of said flange, said disk being dished and provided with an outer grooved tire receiving rim disposed in a vertical plane outside the plane of said flange, and fastening means extending through said plain portions of said ribs and recesses and connecting said hub and disk.

3. A vehicle wheel comprising a hub having a flange provided with a circular series of similar corrugations forming beveled ribs and flaring recesses, two superposed dished disks having central openings adapted to fit over said hub and each provided with a circular series of radial corrugations constituting spoke formations, said corrugations at their inner ends surrounding said hole and forming beveled ribs and flaring recesses, the ribs and recesses of one disk fitting with a wedging action the ribs and recesses of said flange and the ribs and recesses of the other disk fitting with a wedging action the ribs and recesses of the last named disk, and fastening means connecting said hub and disks.

In witness whereof I have hereunto signed my name this 28th day of January, 1920, in the presence of two subscribing witnesses.

HERBERT AUSTIN.

Witnesses:
 GEO. H. GIFFORD,
 WILLIAM ARTHUR HOWITT.